United States Patent [19]

Goksel

[11] 3,895,088
[45] July 15, 1975

[54] METHOD FOR AGGLOMERATING STEEL PLANT WASTE DUSTS

[75] Inventor: Mehmet Adnan Goksel, Houghton, Mich.

[73] Assignee: Board of Control Michigan Technological University, Houghton, Mich.

[22] Filed: Sept. 8, 1972

[21] Appl. No.: 287,346

Related U.S. Application Data

[63] Continuation-in-part of Ser. No. 105,729, Jan. 14, 1971, abandoned.

[52] U.S. Cl. ................................ 264/82; 264/333
[51] Int. Cl. ............................................... B28b 3/00
[58] Field of Search ............... 264/82, 63, 332, 333; 106/120

[56] References Cited
UNITED STATES PATENTS

| | | | |
|---|---|---|---|
| 3,374,085 | 3/1968 | Stone | 75/3 |
| 3,505,439 | 4/1970 | Moorehead et al. | 106/120 |

FOREIGN PATENTS OR APPLICATIONS

| | | | |
|---|---|---|---|
| 844,529 | 6/1970 | Canada | 75/3 |

*Primary Examiner*—Robert F. White
*Assistant Examiner*—J. R. Hall

[57] ABSTRACT

Highly crush-resistant hardened agglomerates are produced from steel plant waste dusts by forming a moistened mixture including (a) one or more of such dusts, (b) about 2 to about 20 weight percent of a bonding agent, such as lime or calcium hydroxide, and (c) about 0.5 to about 5 weight percent of a siliceous material, such as silica; aging the moistened mixture at an elevated temperature for a sufficient time to hydrate the overburned lime and/or slag contained therein; forming the aged mixture in discrete, green agglomerates; adjusting the moisture content of the green agglomerates to about 5 weight percent or less; and then hydrothermally hardening the green agglomerates to a hardened form. The crushing or compressive strength of the hardened agglomerates can be further increased by subjecting them to a drying step to remove at least a portion of the moisture contained therein immediately after the hydrothermal hardening step.

15 Claims, No Drawings

METHOD FOR AGGLOMERATING STEEL PLANT WASTE DUSTS

CROSS REFERENCE TO RELATED APPLICATION

This application is a continuation-in-part of copending application Ser. No. 105,729 filed Jan. 14, 1971 and now abandoned

BACKGROUND OF THE INVENTION

This invention relates to agglomeration and, more particularly, to the agglomeration of steel plant waste products.

Several iron-rich, solid by-products in fine particulate form are generated during the production of pig iron and steel. Reclamation of these products is economically desirable because of the valuable iron contained therein and the elimination of a disposal problem. Such steel mill waste products include dust recovered from the fumes of basic oxygen furnace, open hearth and blast furnace processes, mill scale fines, chamber dust, and sludge or filter cake. Primarily because of the dusting tendency of such products, it has been found desirable, and in some cases absolutely essential, to agglomerate the finely divided particles into relatively larger pellets so that they can be conveniently handled and transported, especially when they are to be recycled as a charge to a steel making process. Various processes have been proposed for agglomerating these products; however, most of these processes have met with a limited degree of success, either because of high cost or the poor structural characteristics of the resultant agglomerates.

For example, in one proposed process the finely divided iron bearing particles are agglomerated into an integral mass by sintering molded lumps or globules thereof at elevated temperatures, e.g. 2000°F, for an extended time period to obtain an incipient fusion of particles and thereby form a friable mass which is then crushed and screened. In another process, the fine particles are admixed with bentonite and either lime or crushed limestone, formed into agglomerates, and the agglomerates are then heated at a temperature of 2400 to 2500°F to form hardened pellets. In a further process, the fine particles are mixed with a binder such as sodium silicate, coal tar, bitumen, spent sulfite liquor, and the like, and then formed into agglomerates which are heated for prolonged periods of time at elevated temperatures to form integrally bonded masses.

The agglomerates produced by many of these processes are undesirable for recycling a steel making process because the binders used increase the quantity of impurities and slag formation in the process with the corresponding reduction in efficiency. Also, the elevated temperatures and prolonged heating periods used by most of these processes are quite costly because of the massive equipment and high energy required. Probably more importantly, the resultant hardened agglomerates frequently do not have sufficient structural strength to withstand breakage during handling, transportation, and storage.

SUMMARY OF THE INVENTION

The primary object of this invention is to provide an inexpensive, low temperature process for producing high strength, crush-resistant agglomerates from iron-rich steel plant by-product dusts.

Another object of this invention is to provide such a process wherein the agglomerate produced thereby is suitable as a charge to a steel making process.

The process of this invention broadly includes the steps of preparing a moistened mixture containing one or more steel plant waste dusts, about 2 to about 20 weight percent of a bonding agent and about 0.5 to about 5 weight percent of a siliceous material (both based on the total dry weight of the mixture), aging the moistened mixture at an elevated temperature for sufficient time to hydrate the overburned lime and/or slag contained in the steel plant waste dust, forming the aged mixture into discrete agglomerates, adjusting the moisture content of the agglomerates to about 5 weight percent or less, and hydrothermally curing the agglomerates at a relatively low temperature to a hardened, crush-resistant form. Also, in accordance with this invention, the crushing or compressive strength of the hardened agglomerates can be further increased by subjecting them to a drying step immediately after the hydrothermal hardening step.

DESCRIPTION OF THE PREFERRED EMBODIMENTS

As used herein, the term "steel plant waste dust" means finely divided, iron-rich, solid particulates and fines, preferably containing about 30 to 80 weight percent iron, which are recovered as by-products from steel making processes and include dust collected from the fumes from basic oxygen furnace (BOF), open hearth, blast furnace, and electric furnace processes, mill scale fines, grit chamber dust, fines separating from pelletized iron ore, and mixtures thereof.

BOF dust is comprised of extremely fine divided particles, most of which are usually spherical in shape, with about 80 percent being smaller than 0.5 microns, about 20 percent being between 0.1 and 0.3 microns and some being as small as 0.05 microns. BOF dust typically contains some slag, overburned lime and graphite and, depending upon the type of scrap used as part of a charge to the process, may include some zinc, lead and other metallic elements.

Spark box fines are generated during the same production step as BOF dust. The chemical composition of these fines is similar to BOF dust, but they generally are larger and consist primarily of irregular shaped, fused slag and iron oxides.

Open hearth dust is chemically and physically quite similar to BOF dust, but contains less slag and overburned lime.

Blast furnace dust is collected from the flue gases. The large particles are first removed in a dust collector, after which the fine particles are usually collected by wet scrubbing and subsequently recovered from the sludge as vacuum filter cake. Blast furnace dust coarser then about 6 mesh consists mostly of limestone, coke and iron fines. The chemical composition of the finer flue dust and filter cake may vary, since the classifiers in many plants are considered to be a location for disposing all types of fine solid waste.

Mill scale consists primarily of metallic iron, some iron oxides and contamination from hot top refractories. The larger particles are screened out and can be returned directly to the blast furnace. The fine particles used in this process require agglomeration before they can be returned to the process.

Grit chamber dust is produced when surface of steel ingots and the like are ground to remove the outer oxidized coating prior to various finishing operations, such as painting or galvinizing. Various abrasive material such as sand, aluminum oxide, synthetic abrasives and cast iron fines are mixed in this dust.

The chemical composition and size analysis of typical steel plant waste dust are listed below in Tables I and II, respectively.

TABLE I

CHEMICAL ANALYSES OF TYPICAL STEEL PLANT WASTE DUSTS

| CONSTITUENT | WEIGHT PERCENT | | | | | | | |
|---|---|---|---|---|---|---|---|---|
| | B.O.F. Dust | Open Hearth Dust | Blast Furnace Flue Dust | Filter Cake | Mill Scale Fines | Spark Box Fines | Pellet Fines | Grit Chamber Dust |
| Fe | 61.47 | 65.42 | 34.50 | 44.70 | 73.85 | 57.90 | 60.85 | 69.00 |
| CaO | 5.15 | 0.52 | 7.81 | 3.58 | 0.07 | 4.50 | 0.81 | 1.59 |
| MgO | 1.30 | 0.13 | 2.55 | 1.03 | 0.02 | 1.86 | 0.76 | 0.50 |
| $SiO_2$ | 2.04 | 0.42 | 6.36 | 4.65 | 0.48 | 5.70 | 7.61 | 1.54 |
| $Al_2O_3$ | 0.09 | 0.05 | 1.81 | 1.17 | 0.21 | 1.21 | 1.96 | 0.40 |
| Zn | 1.06 | 0.35 | — | — | — | — | — | — |
| Pb | 0.17 | 0.70 | — | — | — | — | — | — |
| S | 0.10 | 0.05 | 0.22 | 0.38 | 0.01 | 0.03 | 0.01 | 0.03 |
| P | 0.12 | 0.34 | — | — | — | — | — | — |
| Na | 0.18 | 0.02 | — | — | — | — | — | — |
| K | 0.37 | 0.34 | — | — | — | — | — | — |
| C | 0.23 | 0.22 | 23.11 | 12.18 | 0.16 | 2.39 | — | 1.58 |
| I.L.[1] | — | — | 28.00 | 16.40 | 7.09 | 2.64 | 0.08 | 4.29 |
| Water | — | — | 9.00 | 30.00 | 3.30 | 9.50 | 2.80 | 11.80 |

(1) Ignition loss

TABLE II

SIZE ANALYSES OF TYPICAL STEEL PLANT WASTE DUSTS

| SCREEN MESH SIZE | WEIGHT PERCENT RETAINED | | | | | | | |
|---|---|---|---|---|---|---|---|---|
| | B.O.F. Dust | Open Hearth Dust | Blast Furnace Flue Dust | Filter Cake | Mill Scale Fines | Spark Box Fines | Pellet Fines | Grit Chamber Dust |
| +3 | — | — | 0.70 | — | 0.55 | 7.16 | 4.50 | — |
| 4 | — | — | 1.11 | — | 0.99 | 8.71 | 0.35 | — |
| 6 | — | — | 1.14 | — | 1.02 | 10.79 | 3.26 | — |
| 8 | — | — | 1.25 | — | 2.23 | 7.14 | 20.87 | — |
| 10 | — | — | 1.19 | — | 2.95 | 6.79 | 33.71 | 0.16 |
| 14 | — | — | 1.73 | — | 5.35 | 6.51 | 18.84 | 0.26 |
| 20 | — | — | 2.50 | — | 9.51 | 6.30 | 7.19 | 0.57 |
| 28 | — | — | 6.75 | — | 17.79 | 7.26 | 3.36 | 1.97 |
| 35 | — | — | 9.14 | — | 15.67 | 5.04 | 1.13 | 4.03 |
| 48 | — | — | 13.39 | — | 16.45 | 5.43 | 0.62 | 11.75 |
| 65 | — | — | 12.64 | 1.20 | 10.19 | 3.85 | — | 15.90 |
| 100 | — | — | 17.73 | 2.92 | 8.32 | 3.88 | 0.59 | 19.20 |
| 150 | — | — | 12.76 | 4.17 | 4.49 | 2.78 | — | 12.35 |
| 200 | — | — | 8.25 | 5.12 | 2.48 | 2.33 | 0.68 | 14.76 |
| 270 | — | — | 3.85 | 4.12 | 1.13 | 1.71 | — | 8.75 |
| 325 | — | — | 2.17 | 3.14 | 0.38 | 1.10 | 0.86 | 5.11 |
| 400 | 36.70 | — | 4.34 | 79.37 | — | — | 3.65 | 6.54 |
| 500 | — | 11.60 | — | — | — | — | — | — |
| Pan | 63.30 | 84.40 | — | — | 0.52 | 13.25 | — | — |

In accordance with this invention, a starting mixture is first prepared by blending together one or more steel plant waste dusts with a finely divided bonding agent and a finely divided siliceous material. The constituents of the starting mixture can be blended together in dry form or added together with water and blended to form a homogeneous dispersion.

Acceptable bonding agents include the oxides, hydroxides and carbonates of calcium and magnesium and mixture thereof, with lime and hydrated lime being preferred. The quantity of bonding agent used may range from about 2 to about 20 weight percent, based on the total weight of the dry solids. Concentrations of bonding agent lower than about 2 weight percent generally produce a hardened agglomerate having inadequate strength for handling or transportation. The upper limit of the bonding agent concentration in the starting mixture is dictated primarily by the amount of silicate and other slagforming impurities contained in the steel plant waste dust used. Amounts in excess of about 20 weight percent do not appreciable increase the strength of the agglomerates and dilutes the concentration of the iron therein. Preferably, the concentration of bonding agent used in the starting mixture is in the range of about 5 to about 10 weight percent, based on the total weight of the dry solids.

The siliceous material used in the process of this invention can be any natural or artificial siliceous material containing silica which is capable of reacting with the bonding agent to form silicate bonds therewith under the conditions of the hydrothermal hardening step. Representative example of acceptable siliceous materials includes finely ground quartz, silica sand, bentonite, diatomaceous earth, Fuller's earth, sodium, calcium, magnesium and aluminum silicates, pyrogenic silicas, various hydrated silicas, and mixtures thereof. Of these, finely ground quartz and silica sand are preferred. The quantity of siliceous material used in the starting mixture can in the range of about 0.5 to about 5 weight percent, preferably about 3 weight percent, based on the total weight of the dry solids.

In addition to the steel plant waste dust, the bonding agent, and the siliceous material, other strengthening additives can be included in the starting mixture to further increase the strength of the resultant hardened agglomerate. For example, oxides, hydroxides, carbonates, bicarbonates, sulfates, bisulfates and borates of alkali metals (e.g. potassium and sodium) and mixtures thereof can be added in amounts ranging up to about 3 weight percent. Of these, sodium hydroxide, sodium carbonate and sodium bicarbonate are preferred. Although concentrations of these materials in excess of about 3 weight percent will provide further strengthening, such higher concentrations may possibly cause operating difficulties in steel making processes when the agglomerates are recycled to a steel making process. Concentrations as low as about 0.05 weight percent produce a measurable increase in agglomerate strength; however, it is generally preferred to include about 0.15 to about 1 weight percent of these strengthening agents.

The strengthening agents are preferably added to the starting mixture in the form of an aqueous solution which may range in strength and concentration from about 10 to about 75 percent by weight and preferably about a 50 percent solution. The strengthening agent also can be added in dry form as finely divided particles, but due to their hygroscopicity, toxicity and corrosivity, it is preferred to employ an aqueous solution, which provides the further advantage of easier handling and uniform dispersion throughout the starting mixture. The particular concentration of the aqueous solution of the strengthening agent can be varied consistent with consideration of such factors as the water content in the initial starting mixture, the optimum water content desired for the specific technique employed for forming the green agglomerates and the like.

It has been found that organic bases and their salts, such as quaternary ammonium hydroxides, chlorides and amines, react in a manner similar to the alkali metal oxides, hydroxides, carbonates, and bicarbonates under the conditions of the hydrothermal curing step to provide agglomerates of improved bond strength. Representative examples of such compounds include tetramethyl ammonium hydroxides, tetraethyl ammonium hydroxides, tetraethanol ammonium hydroxides, trimethyl hydroxy ethyl ammonium hydroxide, phenyl trimethyl ammonium hydroxide, benzyl trimethyl ammonium hydroxide, diethanol amine, triethanol amine, diethylene triamine and triethyl ammonium chloride.

If desired, a solid reductant, such as a finely divided carbonaceous material can be added to the starting mixture. The addition of a solid reductant is particularly advantageous when the hardened agglomerates are to be metallized or the steel plant waste dust used, such as BOF dust, includes substantial quantities of zinc and/or lead which must be removed from the agglomerates before they can be charged to a steel making furnace. Since the hydrothermal curing step of this invention is performed at relatively low temperatures, the solid reductant remains substantially intact with in the hardened agglomerate. Hence, it is available for the conversion of iron oxide to metallic iron and the reduction of any zinc and/or lead oxides which may be present in the agglomerate. The hardened agglomerates can be then metallized, i.e., the iron oxide converted to metallic iron, and the zinc and/or lead removed, i.e. their oxides reduced, by simply heating them to an elevated temperature in the range of about 1900 to about 2400°F without any additional reducing agents.

The solid reductant used is a carbon containing material, such as coke, coke breeze, anthracite coal, bituminous coal, lignite, and the like. The solid reductant should contain free carbon and supply sufficient carbon, in conjunction with the free carbon present in the steel plant waste dust used, to convert all the iron oxide to metallic iron and reduce the zinc and/or lead oxides during the subsequent heating step. The temperature of the hydrothermal hardening step is maintained substantially below the combustion temperature of the carbonaceous material so that substantially all the free carbon of the agglomerate remains available for reduction. Therefore, it is a simple manner to determine the amount of solid reductant required to obtain the desired reduction, i.e., an amount corresponding to the available carbon stoichiometrically required to reduce the iron, zinc and lead oxide present in the starting mixture constituents.

Preferably, the amount of solid reductant used is slightly in excess of that stoichiometrically required; however, this excess should be kept to a minimum to prevent unnecessary reductions in the compressive strength of the agglomerate and dilution of the resultant iron content of the agglomerate. Generally, the amount of solid reductant used in the starting mixture should contain sufficient carbon to make the total equivalent fixed carbon of the starting mixture in the range of about 5 to about 25 weight percent, preferably about 10 to about 15 weight percent, based on the total weight of the dry solids.

The amount of water added to the starting mixture, as well as the average size distribution of the steel plant waste dust, the bonding agent, the siliceous material and other solid additives included in the starting mixture, will vary depending upon the physical and chemical characteristics of the particular steel plant waste dust used and the particular agglomeration technique employed. For example, when a pelletizing process using a drum or disc is used to form spherical pellets, the total amount of water in the moistened starting mixture generally should be in the range of about 4 to about 14 weight percent, preferably about 6 to about 9 weight percent. On the other hand, when a briquetting press is used, the total amount of water in the moistened starting mixture generally should be about 2 to about 7 weight percent, preferably about 3 to about 5 weight percent.

Particle size of the various solid materials included in the starting mixture generally can range from about 10 to about 400 mesh with all preferably being less than about 20 mesh. Particle sizes coarser than about 10 mesh increases the difficulty of obtaining a homogeneous mixture of the constituents and, in some cases, provides insufficient surface area to obtain the requisite high strength bond in the resultant hardened agglomerate. Hence, the size of the materials of the starting mixture is controlled within the ranges below about 10 mesh and preferably with at least half of the material in sizes less than 200 mesh. As evidenced by the size analyses of typical steel plant waste dusts presented in Table II above, a substantial portion of the particles of some of these dusts is smaller than 400 mesh. For instance, 63.60 weight percent of a typical B.O.F. dust have a particle size smaller than 400 mesh since that portion passes both a 400 mesh and a 500 mesh screen. Likewise, 96 (sum of listed values) weight percent of a typical open hearth dust and 13.25 weight percent of typical spark box fines pass through a 400 mesh screen.

It has been found that, unless the moistened mixture is aged under certain conditions prior to agglomeration, swelling and cracking of the agglomerates occurs during the hydrothermal curing step causing substantial weakening of the hardened agglomerates. Although not yet fully understood at this time, it is believed that the swelling and cracking is caused by a volume expansion produced by the hydration of the overburned lime and/or hydratable slag materials normally present in appreciable amounts in many steel plant waste dusts. When an aging step is used in accordance with this invention, apparently at least a substantial amount of the overburned lime and/or hydratable slag is hydrated prior to the hydrothermal curing step and swelling and cracking is minimized.

This aging can be advantageously accomplished by heating the moistened starting mixture at an elevated temperature within a closed container and in the presence of a moist atmosphere containing water vapor up to 48 hours. Preferably, the desired aging is produced by placing the moistened starting mixture in a closed container, which is initially at atmospheric pressure, and heating and maintaining the mixture at a temperature of about 80° to 90°C in the presence of saturated or substantially saturated steam for about 2 to about 48 hours, preferably about 12 to about 24 hours.

Lower heating temperature and shorter times can be used; however, it has been found that the hardened agglomerates have lower strength. If desired, the aging can be accelerated by using a pressurized vessel and higher temperatures, and pressures. When this technique is used, a pressure in the range of about 150 to about 400 psig, preferably about 200 psig, a temperature of about 186 to about 232°C, and a heating time of about 15 minutes to about 3 hours, preferably about 30 to about 60 minutes, can be used. Use of these higher pressures and temperatures generally is less preferred because of the higher operational costs. It can be appreciated that the temperature and time required to obtain the desired aging, i.e. hydration of the overburned lime and/or slag, is largely dependent upon the concentrations of these materials and the particle size of the steel plant waste dust used in the starting mixture, with longer times generally being required for higher concentrations of these materials and larger particle sizes of the steel plant waste dust.

After aging, the mixture is formed into green agglomerates of the desired size and shape for the intended end use by a conventional agglomeration technique, such as molding, briquetting, pelletizing, extruding, and the like. The green agglomerates are preferably formed into relatively compact configurations, such as cylinders, spheres, egg shapes, pillows, etc., and are substantially devoid of any thin sections or sharp angularity which might be susceptible to fracture or breakage during handling. The configuration of the agglomerates is also controlled so they do not become tightly compacted when stacked together and thereby prevent the passage of a heated moisture-laden fluid between them during the subsequent hydrothermal hardening step. When in the form of spherical pellets, the green agglomerates generally have a diameter of about 5 to 35 millimeters, preferably about 10 to about 25 millimeters. When briquetting is used, the agglomerates are preferably in a pillow or egg shape and have a major diameter ranging up to 50 millimeters. It should be appreciated, however, that larger agglomerates can be formed in accordance with this invention.

It has been found that the moisture content of the green agglomerates must be adjusted to about 5 weight percent or less prior to the hydrothermal hardening step in order to obtain a resultant hardened agglomerate having an acceptable compressive strength. This moisture adjustment can be accomplished by conventional drying means, such as an oven, with convenient drying temperatures up to about 400°C. Of course, the time required to reduce the moisture content to about 5 weight percent or less depends upon the drying temperature used, the moisture content of the green agglomerates, the level to which the moisture content is reduced, size and shape of the green agglomerates, etc. The rate of drying must be below a level where bursting of the green agglomerates occurs. If desired, the green agglomerates can be dried to a substantially bone dry condition and then sprayed with sufficient water to raise the moisture content to the desired level.

After the moisture content of the green agglomerates has then been adjusted to about 5 weight percent or less, they are introduced into a reaction chamber or pressure vessel, such as an autoclave, where they are heated to an elevated temperature in the presence of moisture to effect a hardening and bonding of the individual particles of each into an integral, high strength mass. The strength of the hardened agglomerate produced by this hydrothermal hardening step depends to some extent upon the temperature, time and moisture content of the atmosphere used.

The application of heat to the green or unhardened agglomerates may be achieved in any one of a number of methods. The use of steam is preferred because it simultaneously provides a source of heat and moisture necessary for the hydrothermal reaction. Either saturated steam or substantially saturated steam can be used. The use of superheated steam at high temperatures produces a dry condition which results in weaker agglomerates. Therefore, it is preferable to use steam with temperatures and pressures at or close to that of saturated steam. Temperatures generally ranging from about 100 to about 244°C, preferably 208° to about 225°C, can be satisfactorily employed to achieve the hardening of the green agglomerates in a reasonable time period.

Although the hydrothermal reaction can be achieved at atmospheric pressure, it is preferred to employ pressure greater than atmospheric, i.e., up to pressures approaching the capacity of the conventional pressure vessel, in order to decrease the curing time and to improve the strength of the resultant hardened agglomerates. Generally, economic considerations dictate that the upper limit of pressure used should be about 500 psig. The pressure preferably is in the range of about 150 to about 350 psig.

It can be appreciated that the retention time of the agglomerates in the reaction chamber depend upon several process variables, such as pressure, temperature and atmosphere of the chamber, composition of the agglomerates, etc. In any case, this time must be sufficient to obtain hardening and bonding of the individual particles of the agglomerates into a hardened, high strength condition. When higher temperatures and pressures are used, the time for the hydrothermal curing step is generally in the range of about 5 minutes to about 8 hours, preferably about 30 to 60 minutes.

The hardened agglomerates are removed from the reaction chamber, and upon cooling are ready for use. When removed from the reaction chamber, the hot, hardened agglomerates usually contain approximately 0.5 to 1.5 weight percent free moisture. Although the agglomerates have superior strength characteristics upon cooling, it has been found that the compressive strength of the hardened agglomerates can be increased significantly by rapidly drying them, immediately after removal from the reaction chamber and before appreciable cooling has occurred, to remove at least a substantial portion of the moisture remaining in the agglomerates. This drying can be accomplished in any convenient manner, such as in an oven or by blowing warmed air over the agglomerates. Generally, a temperature of about 100 to about 350°C, preferably about 150° to about 250°C, can be used for this drying step.

Attempts have been made to define the specific nature of the bonding mechanism produced by the process of this invention. It has been determined that the heat, pressure, and moisture condition of the hydrothermal hardening step causes a formation of gels at the points of contact of agglomerate particles and that these gels harden upon drying of the agglomerate to form bonds between the particles. It has also been determined that the siliceous material, particularly silica, and the bonding agent, particularly lime, are important constituents for the formation of these gels and that the strengthening agents tend to accelerate the gel formation. Generally, it has been found that the use of alkali metal compound produces stronger bonds than alkaline earth oxides, hydroxides and carbonates. Hence, it appears that gels formed in the presence of the alkali metal compounds have a different chemical composition and/or physical arrangement than those formed in the presence of these alkaline earth compounds.

The following examples are presented to illustrate this invention and should not be construed as limitations thereto.

EXAMPLE 1

In order to better understand the nature of the bonding mechanism, a study was made to identify the characteristics of the matrix of agglomerates made according to the process of this invention. As used herein the term "matrix" means the non-iron oxide portions of the agglomerate (e.g. metallic iron, lime, silica, slag and coke) which acts to bond the agglomerate together. The agglomerates investigated were hydrothermally cured at a temperature of about 200°C and a pressure of approximately 200 psig. Calcium hydroxide was used as a bonding agent and diatomaceous earth as the siliceous material.

The matrix of the agglomerates were examined by electron microprobe. It was observed that the matrix of all of the agglomerates consisted of more than one phase. From this observation, it is believed that one phase of the matrix may be the remnants of silicates contained in the steel plant waste duct used in the starting mixture and other unreacted additives. The remaining phases were apparently formed during the hydrothermal curing step. During this analysis, Ca, Si, Fe and Mg were identified as the major components in the agglomerate matrix. Although not positively identified, it is assumed that oxygen and water comprised the remainder of the matrix.

The following exemplifies an analysis of pellets made in accordance with this invention. The starting mixtures consisted of BOF dust and mill scale in 1:2 weight ratio, 5 wt. % $Ca(OH)_2$, 3 wt. % $SiO_2$, and water. Pellets formed from this mixture were hydrothermally cured in the presence of steam at a temperature of about 216°C and a pressure of 200 psig for about 30 minutes. From an electron microbe analysis, Ca, Si, Fe, and Mg were identified as the major cations in the matrix of the pellets. Although a separate analysis was not made, it is reasonable to assume that these elements were present as compounds of oxides and hydrates. It was observed that the concentration of the various elements were not uniform, which implies many phases of varying composition were present. However, the average composition of the matrix was 8.6 wt. % CaO, 7.4 wt. % $SiO_2$, 3.3 wt. % MgO, with the $CaO/SiO_2$ ratio being about 1:2. From the data obtained from this analysis, it did not appear that any appreciable amounts of the simple hydrates of calcium, silicon, iron and magnesium had been formed.

Since the retention time of the agglomerates in the reaction is relatively short, it is reasonable to assume that chemical equilibrium is not obtained. From studies of the reaction of the compounds involved, it is reasonable to assume that most of the matrix is in a poor crystalline state. This has been corroborated by X-ray diffractogram analysis showing no consistent peak patterns characteristic of crystalline instruction.

EXAMPLE 2

A series of tests were run to evaluate the crushing or compressive strengths of agglomerates formed from various steel mill plant waste dusts characterized in Tables I and II above. Some of the coarser dusts, such as mill scale, spark fine, pellet fines, grit chamber dust, the blast furnace dust were ground to pass through a 100 mesh screen before being added to the starting mixture. The finer dusts, such as BOF dust and filter cake, were added without further processing.

The constituents of the starting mixtures for different batches were blended together in a pan mixer. In addition to one or more steel plant waste dusts, the starting mixture included either 5 wt. % $Ca(OH)_2$ or 3.75 wt. % CaO and 1 to 3 wt. % of a strengthening agent. After initial blending, 5 to 15 wt. % water, based on a total weight of the mixture, was added and mixing was continued for an additional 10 minutes. The batches of the moistened starting mixtures were then aged by placing them in a closed vessel in the presence of moisture and at a temperature of about 80° to 90°C for time periods up to 24 hours.

Pellets were then formed from the aged starting mixtures with an airplane tire (16-inch diameter and 6 inches deep) which was rotated at 50–60 rpm. Small amounts of the moistened starting mixture was first introduced into the tire and, after small seeds had formed, additional amounts of the starting mixture was added to form spherical pellets having a diamter of approximately 15 mm. Crushing or compressive strengths of 15 green pellets randomly selected from each batch was measured immediately after balling with a Catillon spring tester. Another 15 pellets were randomly selected from each batch and the impact strength was determined by dropping them individually from a height of 15 inches onto a one-half inch steel plate. The impact number was determined as an average number of drops to failure. The results of these tests are listed below in Tables III and IV.

The remainder of the green pellets were dried at a temperature of about 110°C. 30 dried green pellets were randomly selected from each batch and the crushing or compressive strengths for 15 of these pellets and the impact strengths for the other 15 were measured in the same manner as described above. The results of these tests are listed below in Tables III and IV.

Pellets from each batch were placed in a 5-liter Cenco-Menzel high pressure autoclave containing 1.5 liters of boiling water. The autoclave was heated to and maintained at a temperature of 216°C and a pressure of 300 psig. After a preselected retention time of 5, 15 or 30 minutes, steam was released and the pellets were removed from the autoclave. The hardened pellets were then dried in an oven for 15 to 60 minutes at a temperature for about 110°C to remove at least a portion of the remaining moisture. The crushing or compressive strengths of 15 randomly selected hardened pellets from each batch were measured with a Dillion tester and the results are listed below in Tables III and IV.

Hardened pellets from some of the batches were heated in an electric furnace in the presence of an oxidizing atmosphere at a temperature of about 1800°F. Linder reduction and tumble tests were made on these and other pellets from the same batches by conventional methods. The results of these tests are listed below in Table V.

TABLE III

PHYSICAL CHARACTERISTICS OF PELLETS FORMED
BY VARIOUS STEEL PLANT WASTE DUSTS

| STEEL PLANT WASTE DUST | GREEN PELLETS | | DRIED PELLETS | | HARDENED PELLETS | | |
|---|---|---|---|---|---|---|---|
| | Comp. Str. Lbs. | Impact No. | Comp. Str. Lbs. | Impact No. | Compr. Str., Lbs., at Different Curing Times, Minutes | | |
| | | | | | 5 | 15 | 30 |
| B.O.F. Dust | 21.7 | 25+ | 164 | 25+ | 273 | 230 | 291 |
| Mill Scale | 14.0 | 24.8 | 34.0 | 1.9 | 242 | 246 | 255 |
| Blast Furnace Flue Dust | 13.6 | 25+ | 31.0 | 2.6 | 70 | 91 | 104 |
| Blast Furnace Sludge | 11.0 | 25+ | 25.0 | 3.4 | 30 | 36 | 38 |
| Open Hearth Dust | 20.0 | 25+ | 110 | 6.7 | 201 | 201 | 198 |
| B.O.F. Spark Box Fines | 14.6 | 25+ | 25.5 | 2.1 | 265 | 254 | 260 |
| Pellet Fines | 11.2 | 9.6 | 14.0 | 1.0 | 303 | 327 | 398 |
| Grit Chamber Dust | 10.3 | 7.1 | 20.3 | 1.1 | 316 | 310 | 364 |

TABLE IV

PHYSICAL CHARACTERISTICS OF PELLETS FORMED FROM VARIOUS
MIXTURES OF STEEL PLANT WASTE DUSTS

| STEEL PLANT WASTE DUST MIXTURE | GREEN PELLETS | | DRIED PELLETS | | HARDENED PELLETS | | |
|---|---|---|---|---|---|---|---|
| | Comp. Str., Lbs. | Impact No. | Compr. Str., Lbs. | Impact No. | Comp. Str., Lbs., at Different Curing Times, Min. | | |
| | | | | | 5 | 15 | 30 |
| B.O.F. Dust 33% Mill Scale 67% | 21 | 25+ | 89 | 5.5 | 493 | 507 | 508 |
| B.O.F. Dust 33.3% Mill Scale 33.3% B.F Flue Dust 33.3% | 12.7 | 22 | 31 | 2.0 | 234 | 239 | 250 |
| B.O.F. Dust 30% Mill Scale 40% B.F Flue Dust 30% | 11.4 | 24 | 28 | 2.1 | 161 | 204 | 421 |
| B.O.F. Dust 35% B.F Flue Dust 20% Sludge 45% | 14.5 | 25+ | 32 | 2.6 | 111 | 145 | 152 |
| B.F. Flue Dust 10% Grit Chamb. Dust 20% Slude 70% | 10.1 | 25+ | 18.5 | 3.2 | 41 | 50 | 44 |
| Pellet Fines 50% Sludge 50% | 11.6 | 25+ | 24 | 2.4 | 71 | 94 | 100 |
| Pellet Fines 67% Sludge 33% | 10.9 | 25+ | 22 | 2.0 | 92 | 138 | 164 |
| Pellet Fines 75% Sludge 25% | 10.2 | 20 | 15 | 1.9 | 75 | 153 | 200 |

TABLE V

PHYSICAL CHARACTERISTICS OF PELLETS FORMED FROM VARIOUS STEEL PLANT WASTE DUSTS

| PARAMETER | STEEL PLANT WASTE DUST INCLUDED IN STARTING MIXTURE [1] | | | |
|---|---|---|---|---|
| | B.O.F. Dust-100% | B.O.F. Dust-33% Mill Scale-67% | Pellet Fines-75% Sludge-25% | B.O.F. Dust-30% Mill Scale-40% Blast Furnace-Fine Dust-30% |
| Compressive strength, lbs. | | | | |
| Hardened in autoclave | 291 | 508 | 200 | 421 |
| Subsequently heated to 1800°F | 452 | 538 | 406 | 401 |
| Linder reduction test | | | | |
| Degree oxidation (1000°C), % | — | — | 34.41 | 21.42 |
| Reduction, % | — | — | 65.59 | 78.58 |
| Metallization, % | — | — | 50.47 | 70.20 |
| Abrasion index, % | | | | |
| +3 Mesh | 94.50 | 97.50 | 64.76 | 96.08 |
| −14 Mesh | 4.10 | 1.80 | 27.88 | 3.92 |
| Tumble index, % | | | | |
| +3 Mesh | 78.80 | 97.60 | — | 95.24 |
| −20 Mesh | 14.40 | 2.00 | — | 3.94 |
| Bulk density, lb/ft$^3$ | 118 | 130 | 91 | 106 |
| Apparent density, g/cc | 2.40 | 2.66 | 2.11 | 2.39 |
| True density, g/cc | 4.24 | 4.43 | 4.01 | 4.08 |
| Porosity, % | 43.35 | 38.50 | 47.45 | 38.69 |

[1] All percentages of steel plant waste dust expressed as weight percent, based on the total weight of dust included in the starting mixture.

From these test results, it can be seen that strong agglomerates can be produced from various steel mill plant waste dusts and mixtures of the dusts from the process of this invention even though relatively low temperatures and short reaction retention times are used. Agglomerates produced from starting mixtures containing blast furnace flue dust and sludge as the sole steel plant waste dust have lower structural strength than those produced from other steel mill plant waste dusts. As shown in Table IV these dusts can be admixed in various portions with other dusts to produce hardened agglomerates having substantially higher structural strength characteristics. It can also be seen that the crushing strength can be increased by increasing the retention time in the reaction chamber.

In order to be useable for various practical applications, agglomerates produced from steel mill waste dust must be structurally sound enough to withstand the required handling, storing and transportation. When recycled to a steel making process, the operating conditions to some extent also dictate some strength requirements for the agglomerates. For example, the compressive strengths of about 100 to 150 pounds are generally regarded sufficient for agglomerates to be charged to a blast furnace, provided they do not have to be transferred any great distance, and/or handling is not exceptionally rough. However, higher crushing or compressive strengths are usually desired to assure the agglomerates will remain intact during handling and transportation prior to and during introduction into a steel making furnace.

From the test results presented in Tables III - V above, it can be seen that hardened pellets having compressive strengths far in excess of 100-150 pounds can be produced by the process of this invention. As can be seen from the results shown in Table V, the compressive strength of the hardened agglomerates produced from steel plant waste dusts can be further increased by subsequent heating at an elevated temperature. It can also be seen that the agglomerates produced by the process of this invention generally exhibit good reduciability and abrasive resistance.

The process of this invention involves neither oxidation nor reduction during the hardening step, whereas oxidation occurs in most conventional high temperature agglomeration processes. Hence, solid reductants, such as fine coal or coke, which promotes reduction and provides for more efficient blast furnace operation can be included in the agglomerates. If desired, the carbon in blast furnace flue dust and sludge can be used economically and efficiently if mixed with other dust for the production of strong pellets.

Lime, which can be employed as a bonding agent in the process of this invention, also helps to prevent the formation of fayalite slag which is believed to cause some problems in a blast furnace operation.

Another important aspect of this invention is that the hardening of the agglomerates is produced at low temperatures and, therefore, relatively very little heat energy is required. This energy requirement can be reduced even further by recovering heat from the hardened pellets by using burned lime instead of Ca(OH)$_2$ as the bonding agent. If desired, the green pellets can be heated and dried by hot air or an open flame more economically than by drying and heating by steam in the reaction chamber.

EXAMPLE 3

Tests were performed to evaluate the crushing or compressive strengths of pellets prepared from starting mixtures containing varying amounts of a bonding agent, [Ca(OH)$_2$], siliceous material, [−325 mesh SiO$_2$] and a strengthening agent, [Na$_2$CO$_3$]. For these tests a mixture of steel plant waste dusts was used including 30 wt. % BOF dust, 30 wt. % blast furnace flue dust [−200 mesh], and 40 wt. % mill scale (−200 mesh). The mixture of steel plant waste dusts had been pre-autoclaved to hydrate the overburned lime and/or slag contained therein. After the constituents of the starting mixture were blended together, water (10 wt. %, based on the total weight of the dry mixture) was added to each batch and mixing was continued for an additional 10 minutes.

The resultant mixtures were formed into pellets and dried in a manner similar to that described in Example 2. Dried pellets from the different batches were then placed in an autoclave and heated therein at about 200°C and about 300 psig at various time periods. After cooling, the crushing or compressive strengths of the pellets were measured. The results of these tests are listed below in Table VI.

Varying amounts of water was added to the separate batches of the starting mixtures. The moistened mixtures were formed into green spherical pellets having a diameter of 15 mm and the green pellets were hydrothermally cured to a hardened condition in an autoclave in a manner similar to that described in Example 2. After cooling, the crushing or compressive strengths of the hardened pellets were measured. The results of

TABLE VI

COMPRESSIVE STRENGTH OF PELLETS CONTAINING VARYING AMOUNTS OF BONDING AGENT AND SILICEOUS MATERIAL

| PELLET COMPOSITION | | COMPR. STR., LBS. AT DIFFERENT CURING TIMES, HOURS | | | |
|---|---|---|---|---|---|
| Constituent | Wt. % | .5 | 1 | 3 | 5 |
| Steel plant waste dust mixture | 92.40 | | | | |
| $Ca(OH)_2$ | 6.60 | | | | |
| $SiO_2$ | 0.95 | 338 | 346 | 364 | 400 |
| $NaCO_3$ | 0.05 | | | | |
| Steel mill waste dust mixture | 90.40 | | | | |
| $Ca(OH)_2$ | 6.60 | 434 | 443 | 452 | 543 |
| $SiO_2$ | 2.85 | | | | |
| $Na_2CO_3$ | 0.15 | | | | |
| Steel plant waste dust mixture | 89.00 | | | | |
| $Ca(OH)_2$ | 10.00 | 316 | 355 | 340 | 350 |
| $SiO_2$ | 0.95 | | | | |
| $Na_2CO_3$ | 0.05 | | | | |
| Steel plant waste dust mixture | 87.00 | | | | |
| $Ca(OH)_2$ | 10.00 | 474 | 516 | 518 | 606 |
| $SiO_2$ | 2.85 | | | | |
| $Na_2CO_3$ | 0.15 | | | | |

From these tests, it can also be seen that the crushing or compressive strength is increased by using increased amounts of siliceous material and strengthening additive within the limits of the process of this invention.

EXAMPLE 4

A series of tests were performed with pellets prepared from various steel plant waste dust mixtures to determine the effect of moisture content in the green pellets prior to the hardening step on a final crushing or compressive strengths of the hardened pellets. The composition of the starting mixtures used are listed below in Table VII.

TABLE VII

| | PELLET COMPOSITION | |
|---|---|---|
| RUN NO. | Ingredient | Weight % |
| 1 | Mill scale (−65 mesh) | 51.56 |
| | Coarse BOF dust (−20 mesh) | 4.14 |
| | Fine BOF dust (as is) | 34.30 |
| | CaO | 7.00 |
| | $SiO_2$ fines | 2.85 |
| | $Na_2CO_3$ | 0.15 |
| 2 | Mill scale (−65 mesh) | 41.26 |
| | Coarse BOF dust (−20 mesh) | 3.31 |
| | Fine BOF dust (as is) | 27.43 |
| | Blast furnace dust (−10 mesh) | 12.00 |
| | Blast furnace sludge (−10 mesh) | 6.00 |
| | CaO | 7.00 |
| | $SiO_2$ fines | 2.85 |
| | $Na_2CO_3$ | 0.15 |
| 3 | Fine BOF dust (−20 mesh) | 49.40 |
| | Coarse BOF dust (as is) | 5.60 |
| | Scarfer grit (−20 mesh) | 35.00 |
| | CaO | 7.00 |
| | $SiO_2$ fines | 2.85 |
| | $Na_2CO_3$ | 0.15 |
| 4 | Mill scale (−100 mesh) | 41.22 |
| | Filter cake (as is) | 48.78 |
| | CaO | 7.00 |
| | $SiO_2$ | 2.85 |
| | $Na_2CO_3$ | 0.15 | these tests are listed below in Table VIII.

TABLE VIII

| RUN NO. | PELLET DIAMETER | MOISTURE CONTENT OF GREEN PELLETS, WT. % | COMPRESSIVE STRENGTH, lbs. |
|---|---|---|---|
| 1 | 15 mm | 7.7 | 62 |
| | 15 mm | 5.0 | 324 |
| | 15 mm | 2.8 | 331 |
| | 15 mm | 0.0 | 331 |
| 2 | 15 mm | 8.2 | 67 |
| | 15 mm | 3.0 | 283 |
| | 15 mm | 0.0 | 295 |
| 3 | 15 mm | 6.0 | burst |
| | 15 mm | 3.0 | 75 |
| | 15 mm | 0.0 | 362 |
| 4 | 1 inch | 10.9 | 71 |
| | 1 inch | 3.0 | 362 |
| | 1 inch | 0.0 | 309 |

From these results, it can be seen that hardened agglomerates produced from green agglomerates having a moisture content greater than about 5 wt. percent have low crushing or compressive strengths whereas those produced from green agglomerates containing 5 wt. percent or less moisture have very high crushing or compressive strengths.

EXAMPLE 5

Agglomerated pellets were prepared from a dry blended mixture having the following composition:

| INGREDIENT | WEIGHT % |
|---|---|
| Blast furnace flue dust | 13 |
| Blast furnace sludge | 21.6 |
| Mill scale | 51.9 |
| Lime | 10.5 |
| $SiO_2$ | 2.85 |
| $Na_2CO_3$ | 0.15 |
| | 100.00 |

The mixture was moistened by mixing in a quantity of water equal to about 15 wt. % of the total weight of moistened mixture. The moistened mixture was split into two separate batches.

The first batch was stored in a moisturized, closed container at about 80° to 90°C and at atmospheric pressure for about 24 hours. The temperature of the mixture reached approximately 98°C within 40 minutes. This temperature rise apparently was due to the exothermic reaction between the lime and water. After the 24 hours aging period, 1-inch diameter, spherical pellets were formed from this batch with a conventional balling device. The green pellets, which had a moisture content of approximately 5 wt. percent, were then placed in an autoclave wherein they were hydrothermally cured for 1 hour at 300 psig. After being oven dried and air cooled, compressive strengths of 15 randomly selected pellets were measured and the average compressive strength was 460 pounds.

The second batch was stored in a covered vessel at ambient conditions. Apparently due to the exothermic reaction described above, the temperature of this second batch reached approximately the same maximum temperature in about the same time as the first batch. Immediately after this maximum temperature was reached, this second batch was removed from the vessel and was allowed to cool to room temperature, which required approximately 3 hours. After a total standing time of about 24 hours, 1-inch diameter spherical pellets were formed from this second batch and hardened in an autoclave in substantially the same manner as for the first batch. All of the hardened pellets formed from the second batch were found to be swollen and cracked.

From these results, it can be seen that in order to produce hardened agglomerates from steel plant waste dust having the requisite characteristics, the green agglomerates must be aged under moist conditions and at an elevated temperature prior to the hydrothermal curing step.

EXAMPLE 6

Agglomerated pellets were formed from a dry blended mixture having the following composition:

| INGREDIENT | WEIGHT % |
|---|---|
| Mill scale (−200 mesh) | 90 |
| CaO | 7 |
| SiO$_2$ | 2.85 |
| Na$_2$CO$_3$ | 0.15 |
| | 100.00 |

The mixture was moistened by mixing in a quantity of water equal to about 10 wt. percent of the dry weight of the mixture. After being aged overnight, 15 mm diameter, spherical pellets were formed from the moistened mixture in a manner similar to that described in Example 2. The green pellets were dried to remove at least a portion of the moisture contained therein and were then hardened by hydrothermal curing in a autoclave for 1 hour at 300 psig. The hardened pellets were separated into two batches.

The first batch of pellets were allowed to cool in the air and the compressive strengths of 15 randomly selected pellets were measured. The average compressive strength was 245 pounds. The second batch of pellets were immediately dried after autoclaving in an oven at 100°C and then cooled to room temperature and the compressive strengths of 15 randomly selected pellets were measured. The average compressive strength was 336 pounds.

From these results, it can be seen that the crushing or compressive strengths of the hardened agglomerates can be increased substantially (approximately 37% in this case) by immediately drying them after the hydrothermal curing step.

From the above detailed description, it can be seen that steel plant waste dusts can be formed into hardened agglomerates having superior strength characteristics by the process of this invention. Since the process of this invention does not require the use of substantial quantities of materials constituting impurities or causing slag formation in most steel making processes, the hardened agglomerates produced thereby can be recycled as part of the charge to various steel making furnaces. Furthermore, the relatively low temperature of the hydrothermal hardening step permits high strength agglomerates to be produced at substantially reduced costs and permits the incorporation of a solid reductant so that the hardened agglomerates can be easily metallized and zinc and lead removed therefrom by simply heating them to an elevated temperature.

Upon reading the foregoing detailed description of this invention, it will become apparent to those skilled in the art that various modifications and alterations can be made thereto without departing from the spirit and scope of the invention.

I claim:

1. A method for making hardened agglomerated masses from steel plant waste dust containing a hydrateable material selected from the group consisting of overburned lime, hydrateable slag materials and mixtures thereof, comprising the steps of:

a. preparing a moistened mixture including said steel plant waste dust, about 2 to about 20 weight percent of a bonding agent selected from the group consisting of the oxides, hydroxides and carbonates of calcium and magnesium, and mixtures thereof, and about 0.5 to about 5 weight percent of a siliceous material capable of reacting with said bonding agent to form silicate bonds therewith, said weight percentages being based upon the total weight of the dry solids in said mixture and the particle size of the solids in said mixture being less than about 10 mesh;

b. aging said moistened mixture at an elevated temperature in the presence of a moisturized atmosphere containing water vapor for a sufficient time to hydrate substantially all of said hydrateable material contained therein;

c. forming the aged mixture into discrete compact masses;

d. drying said masses to adjust the moisture content therein to about 5 weight percent or less, based on the total weight of the mass, the rate of said drying being below a level where bursting of said masses occurs;

e. hydrothermally hardening said masses by contacting them with saturated or substantially saturated steam at a temperature of about 100° to about 244°C for a period of time sufficient to form hardened and integrally bonded masses, and f. cooling said hardened masses.

2. The method according to claim 1 including the step of:

g. drying said hardened masses immediately after said hydrothermal hardening step and prior to substantial cooling to remove a substantial portion of the moisture contained therein.

3. The method according to claim 1 wherein said aging step is carried out in a closed container initially at atmospheric pressure, in the presence of saturated or substantially saturated steam, and at a temperature of about 80° to about 90°C for a time period of about 2 to about 48 hours.

4. The method according to claim 1 wherein said aging step is carried out in a closed container at a pressure of about 150 to about 400 psig, in the presence of saturated or substantially saturated steam, and at a temperature of about 186° to about 232°C for a time period of about 15 minutes to about 3 hours.

5. The method according to claim 1 wherein said moistened mixtures includes about 2 to about 14 weight percent water, based on the total weight of the mixture.

6. The method according to claim 5 wherein said moistened mixture includes 0 to about 3 weight percent, based on the total weight of the dry solids in said mixture, of a strengthening agent selected from the group consisting of the oxides, hydroxides, carbonates, bicarbonates, sulfates, bisulfates and borates of the alkali metals, quaternary ammonium hydroxides, quaternary ammonium chlorides, quaternary ammonium amines, and mixtures thereof.

7. The method according to claim 6 wherein said bonding agent is calcium oxide or calcium hydroxide.

8. The method according to claim 7 wherein said siliceous material is silica.

9. The method according to claim 8 wherein said strengthening agent is selected from the group consisting of the oxides, hydroxides, carbonates, bicarbonates, and borates of sodium and potassium and mixtures thereof.

10. The method according to claim 9 wherein said strengthening agent is selected from the group consisting of sodium hydroxide, sodium carbonate, and sodium bicarbonate.

11. The method according to claim 6 wherein said hydrothermal hardening step is carried out at a pressure ranging up to about 500 psig.

12. The method according to claim 10 wherein said hydrothermal hardening step is carried out at a temperature of about 208° to about 225°C and at a pressure of about 250 to about 350 psig.

13. A method for making hardened agglomerated masses from steel plant waste dust containing a hydrateable material selected from the group consisting of overburned lime, hydrateable slag materials or mixtures thereof, comprising the steps of:

a. preparing a moistened mixture including said steel plant waste dust, about 2 to 20 weight percent of bonding agent selected from the group consisting of calcium oxide, calcium hydroxide and mixtures thereof, about 0.5 to about 5 weight percent of a silica containing material, 0 to about 3 weight percent of a strengthening agent selected from the group consisting of the oxides, hydroxides, carbonates, bicarbonates, sulfates, bisulfates and borates of sodium and potassium, and mixtures thereof, and about 2 to about 14 weight percent water, the weight percentages of said bonding agent, silica containing material and strengthening agent being based upon the total weight of the dry solids in said mixture and the weight of said water being based upon the total weight of the mixture, the particle size of the solids in said mixture being less than about 10 mesh;

b. aging said moistened mixture in a closed container in the presence of saturated or substantially saturated steam at a temperature of about 80° to about 232°C for a time period sufficient to hydrate said hydrateable material contained therein;

c. forming the aged mixture into discrete compact masses;

d. drying said masses to adjust the moisture content therein to about 5 weight percent or less, based on the total weight of the mass, the rate of said drying being below a level where bursting of said masses occurs;

e. hydrothermally hardening said masses by contacting them with saturated or substantially saturated steam at a temperature of about 100° to about 244°C and a pressure ranging up to 500 psig for a period of time sufficient to form hardened and integrally bonded masses; and f. cooling said hardened masses.

14. The method according to claim 13 including the step of:

g. drying said hardened masses immediately after said hydrothermal cooling step and prior to substantial cooling to remove a substantial portion of the moisture contained therein.

15. The method according to claim 14 wherein said hydrothermal hardening step is carried out at a temperature of about 208° to about 225°C and at a pressure of about 250 to about 350 psig.

* * * * *